US012274194B1

(12) United States Patent
Sagorski

(10) Patent No.: US 12,274,194 B1
(45) Date of Patent: Apr. 15, 2025

(54) PLANT TRANSPLANTER

(71) Applicant: Francis A Sagorski, Traverse City, MI (US)

(72) Inventor: Francis A Sagorski, Traverse City, MI (US)

( * ) Notice: Subject to any disclaimer, the term of this patent is extended or adjusted under 35 U.S.C. 154(b) by 713 days.

(21) Appl. No.: 17/561,981

(22) Filed: Dec. 26, 2021

(51) Int. Cl.
 A01C 11/00 (2006.01)
(52) U.S. Cl.
 CPC .................................. A01C 11/006 (2013.01)
(58) Field of Classification Search
 CPC ..................................................... A01C 11/006
 See application file for complete search history.

(56) References Cited

U.S. PATENT DOCUMENTS

| 32,198 | A | | 4/1861 | Maples |
| 71,133 | A | | 11/1867 | Carmichael |
| 126,941 | A | | 5/1872 | Earle |
| 208,703 | A | | 10/1878 | Avery |
| 289,185 | A | | 11/1883 | Visscher |
| 409,949 | A | | 8/1889 | Foster |
| 437,466 | A | | 9/1890 | Vogel |
| 541,841 | A | | 7/1895 | Doyle |
| 594,668 | A | * | 11/1897 | Wilkens ............... A01G 23/046 414/23 |
| 659,518 | A | | 10/1900 | Estlack |
| 774,293 | A | | 11/1904 | Tregellas |
| 901,279 | A | | 10/1908 | Crenshaw |
| 938,651 | A | | 11/1909 | Doughty |
| 938,759 | A | | 11/1909 | Greene |
| 974,077 | A | | 10/1910 | Kleeberger |
| 1,829,107 | A | | 10/1931 | Neurwell |
| 1,895,214 | A | | 1/1933 | Stork |
| 2,014,311 | A | | 9/1935 | Council |
| 2,028,680 | A | | 1/1936 | Mayeda et al. |
| 2,208,262 | A | * | 7/1940 | Jeffrey ................. A01G 23/043 414/23 |
| 4,625,662 | A | * | 12/1986 | Heinzen ............... A01G 23/046 37/302 |
| 5,431,467 | A | | 7/1995 | Mlecka |
| 5,497,714 | A | | 3/1996 | Schlothauer |
| 5,669,648 | A | * | 9/1997 | Luck ...................... A01B 1/165 294/59 |
| D402,171 | S | | 12/1998 | Miller |
| 6,338,512 | B1 | | 1/2002 | Ruppert et al. |
| 6,966,269 | B2 | | 11/2005 | Sawatzky et al. |
| 7,832,125 | B1 | | 11/2010 | Palmby |
| 2008/0040892 | A1 | * | 2/2008 | Jenkins .................... B25G 1/06 16/426 |
| 2009/0158650 | A1 | | 6/2009 | Johnson |

* cited by examiner

Primary Examiner — Tara Mayo
(74) Attorney, Agent, or Firm — Peter Loffler

(57) ABSTRACT

A plant transplanter is comprised of a pair of blades connected to one another by a pair of chains that allow the varying of the distance between the two blades. Each blade has a vertically upwardly directed shaft such that the two shafts are joined by a horizontally disposed horizontal bar that has a centrally disposed tension rod allowing the length of the horizontal bar to vary between its attachment points with the two shafts. A compass is attached to one of the shafts. Horizontally disposed transverse lift bars are attached to each shaft for heavy lifts.

6 Claims, 5 Drawing Sheets

PLANT TRANSPLANTER

BACKGROUND OF THE INVENTION

1. Field of the Invention

The present invention relates to a device that digs up a plant, including its roots, and carries the plant to a new location whereat the plant can be replanted in the same orientation as at the original location.

2. Background of the Prior Art

When transplanting saplings and other small plants and trees, the task is relatively straight forward. Use a small hand spade to dig up the plant including its roots, place the plant and roots, which often contains the surrounding soil, into one's hand, move the plant to the new location whereat the spade is used to dig a suitably sized hole, place the plant into the hole, and cover with soil. This process is quick and easy and requires but a simple tool to execute the transplanting process.

The difficulty arises in transplanting larger plants and trees. A simple hand-held tool will simply not do the trick when dealing with a larger more mature plant or tree. Typically, a shovel is used such that the soil all around the plant is dug up with the shovel until the plant is loose and ready to be moved. At that point, gardeners try and use the shovel blade underneath the plant's roots to carry the plant to its new location. This carrying helps hold the soil surrounding the roots which can be important especially if the new location where the plant is to be placed has soil of a different PH. Transplanting the plant surrounded by its original soil, allows the plant to transition to the new soil and its new PH to be more drawn out so as to minimize the potential for shocking the plant, possibly fatally. However, as anyone who has tried this method of plant moving can attest, it is not easy and often much of the desired soil is lost, especially when moving a plant with a relatively large root bulb that is substantially larger than the blade of the shovel.

To address this problem, transplanting devices have been proposed. These devices, which come in a wide variety of architectures and work with varying degrees of efficiency, typically have a pair of blades and a handle system. The blades, via the handle system, pivot toward and away from one another so that the blades can be dug into the ground on either side of the plant and its root bulb. Once the blades are at a sufficient depth, they are pivoted toward one another in order to cinch the root bulb of the plant between the blades. The plant is lifted out of the ground via its root bulb and carried in its cinched fashion between the blades to its new location. Once the root bulb is within its hole in the new location, the blades pivot away from one another, releasing the plant into its new location. These devices help minimize soil loss during the move relative to placing the plant onto a horizontally disposed blade of a shovel so that the plant tends to have a better outcome during the transplanting process. However, these devices are not without drawbacks. Many prior art devices are unduly complex in design and construction so that they tend to be expensive to produce and thus cost prohibitive to a consumer. The complexity offers such devices greater potential for breaking. Other devices are complex in operation so that users tend to shy away from their usage. The devices are each of a single size so that only plants within a given size range can be dug up and moved, limiting what a user can move with a given device.

What is needed is a device that can dig up a plant including its root bulb, carry the plant to its new location while minimizing loss of the soil surrounding the root bulb, and thereafter releasing the plant into its new location. Such a device must be of relatively simply design and construction so as to be inexpensive to produce and must be easy to operate so as not to dissuade gardeners from its usage. Such a device must be able to dig up and carry plants and trees that are within a relatively broad range of sizes. Ideally, such a device helps with plant orientation at its new location.

SUMMARY OF THE INVENTION

The plant transplanter of the present invention addresses the aforementioned needs in the art by providing a device that digs up a plant (the term being general to include trees, bushes, etc.,) including its root bulb and the surrounding soil, carries the plant to a new location, and releases the plant into the new location. The plant transplanter is of relatively simple design and construction, being produced using standard manufacturing techniques, so as to make the device relatively inexpensive to produce so as to be economically attractive to potential consumers for this type of device. The plant transplanter is relatively simple to operate so as not to dissuade a gardener from its usage. The plant transplanter is adjustable to allow the device to be used with plants across a broad spectrum of sizes. The plant transplanter allows a user to easily position the plant at its new location in the same orientation as the plant had at its original location which is especially important with more mature plants.

The plant transplanter of the present invention is comprised of a first blade that has a first outer surface and a first inner surface. The first blade also has a first side and a second side. A second blade has a second outer surface and a second inner surface. The second blade also has a third side and a fourth side. A first chain has a set of first links such that one of the first links is attached to the first outer surface of the first blade proximate the first side and another of the first links is removably attached to the second outer surface of the second blade proximate the third side. A second chain has a set of second links such that one of the second links is attached to the first outer surface of the first blade proximate the second side and another of the second links is removably attached to the second outer surface of the second blade proximate the fourth side. A first shaft is attached medially along the first outer surface of the first blade and extends upwardly while a second shaft is attached medially along the second outer surface of the second blade and extends upwardly. A horizontal lift bar is pivotally attached to the first shaft and to the second shaft. The first inner surface of the first blade faces the second inner surface of the second blade. A compass is attached to the first shaft. A first transverse lift bar is attached to the first shaft while a second transverse lift bar is attached to the second shaft, the first transverse lift bar and the second transverse lift bar are each oriented horizontally with respect to their respective shaft and normally with respect to the horizontal lift bar. The horizontal lift bar is comprised of a first section that is attached to the first shaft and a second section that is attached to the second shaft. The first section and the second section are connected to one another by a tension rod that places tension between the first section and the second section and also allows the varying of the distance between the first section and the second section.

BRIEF DESCRIPTION OF THE DRAWINGS

Similar reference numerals refer to similar parts throughout the several views of the drawings.

DESCRIPTION OF THE PREFERRED EMBODIMENT

Figure 1:
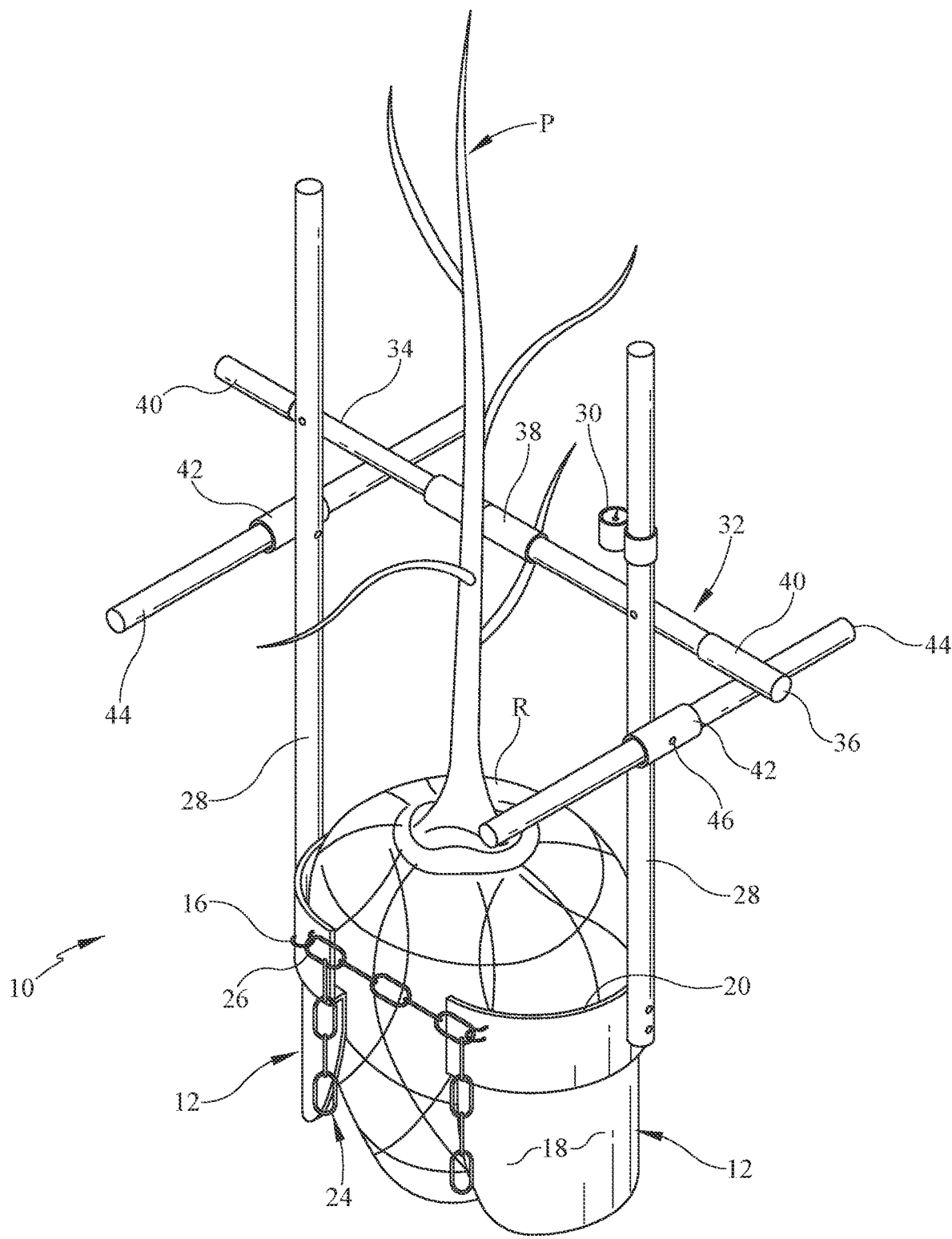
FIG. 1 is an environmental view of the plant transplanter of the present invention grasping a plant.
Figure 2:
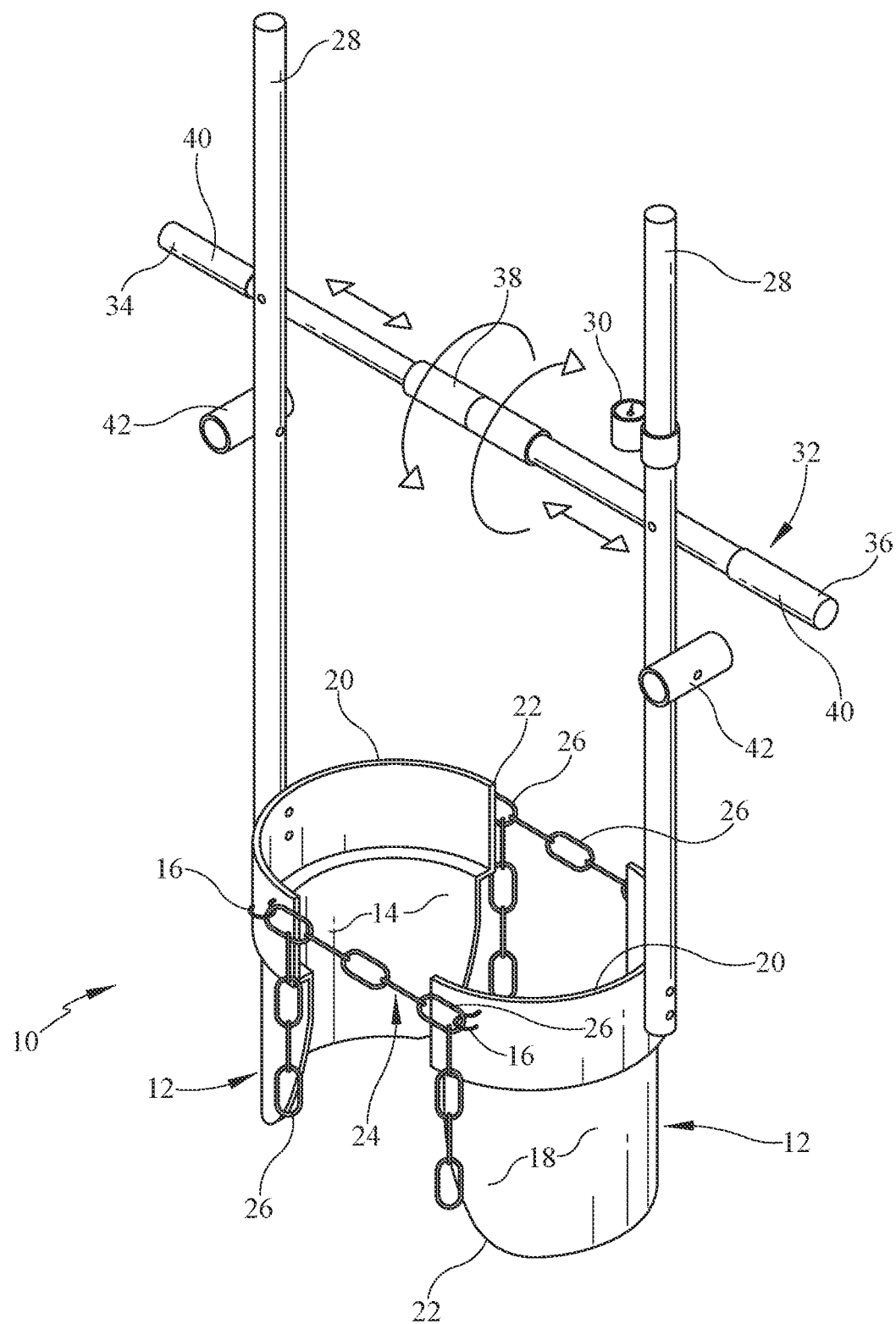
FIG. 2 is a perspective view of the plant transplanter illustrating the working of the tensioned length expansion feature of the horizontal lift bar.
Figure 3:
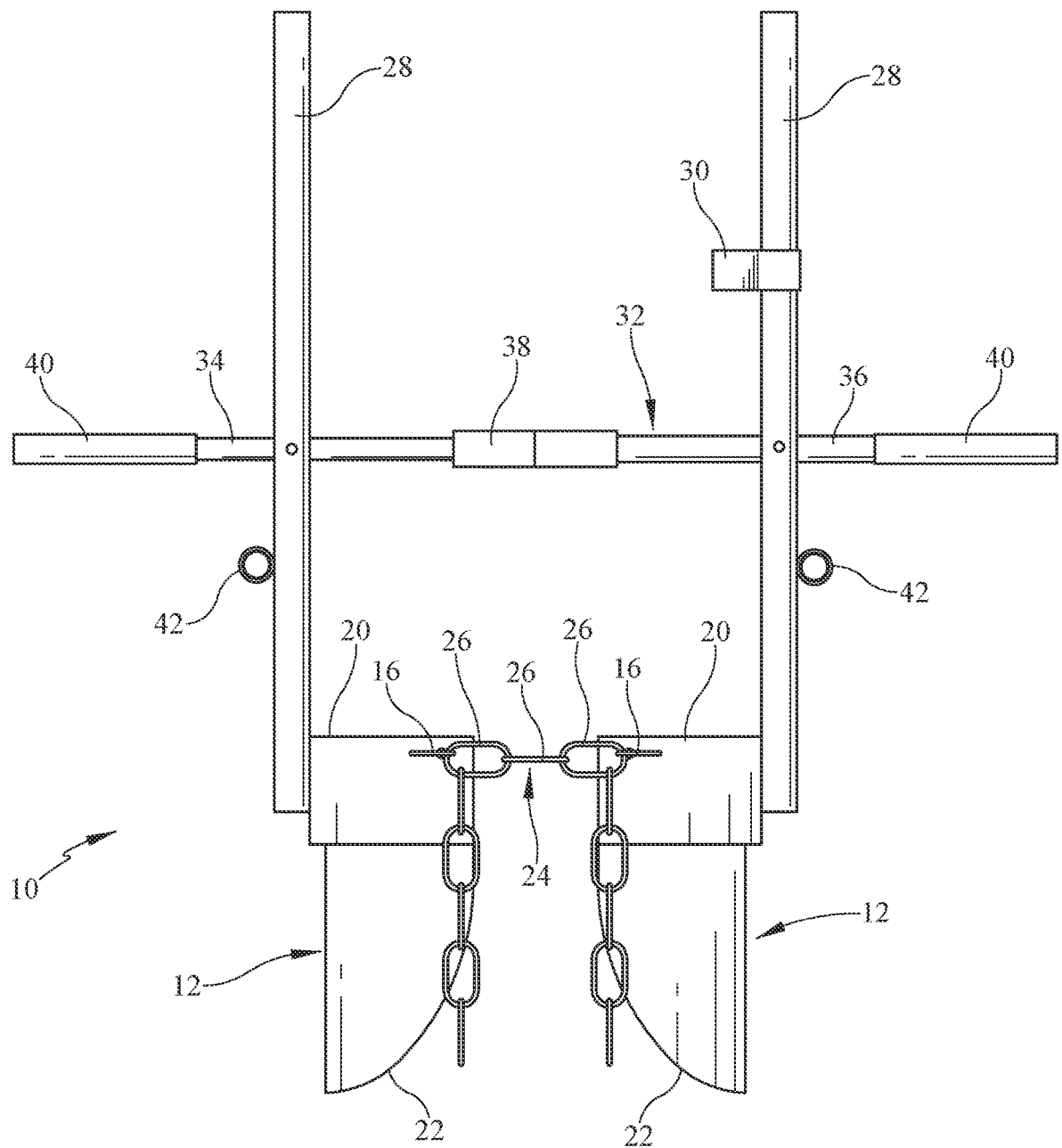
FIG. 3 is a side view of the plant transplanter.
Figure 4:
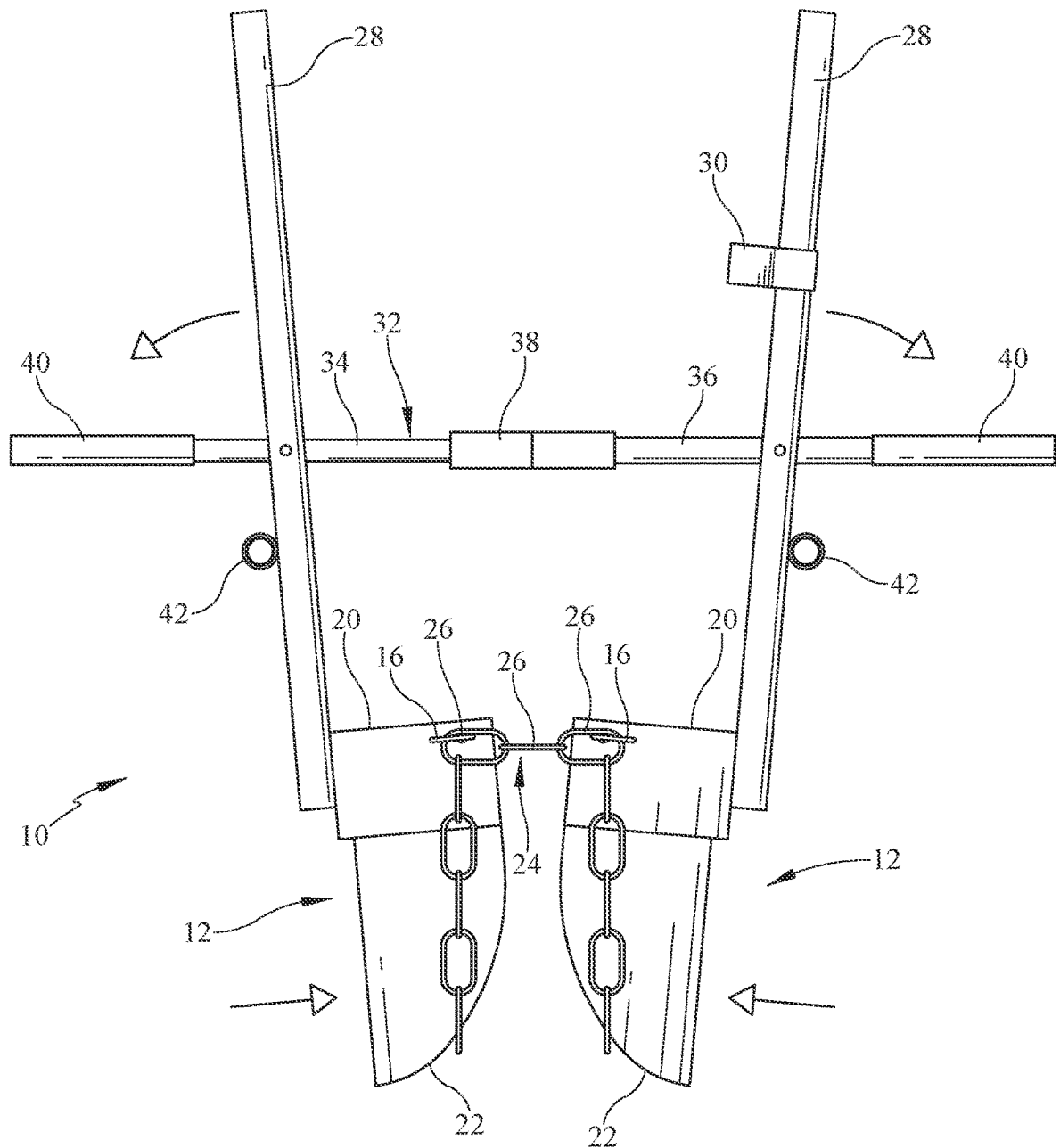
FIG. 4 is a side view of the plant transplanter illustrating the pivoting action of the device for grasping a plant.
Figure 5:
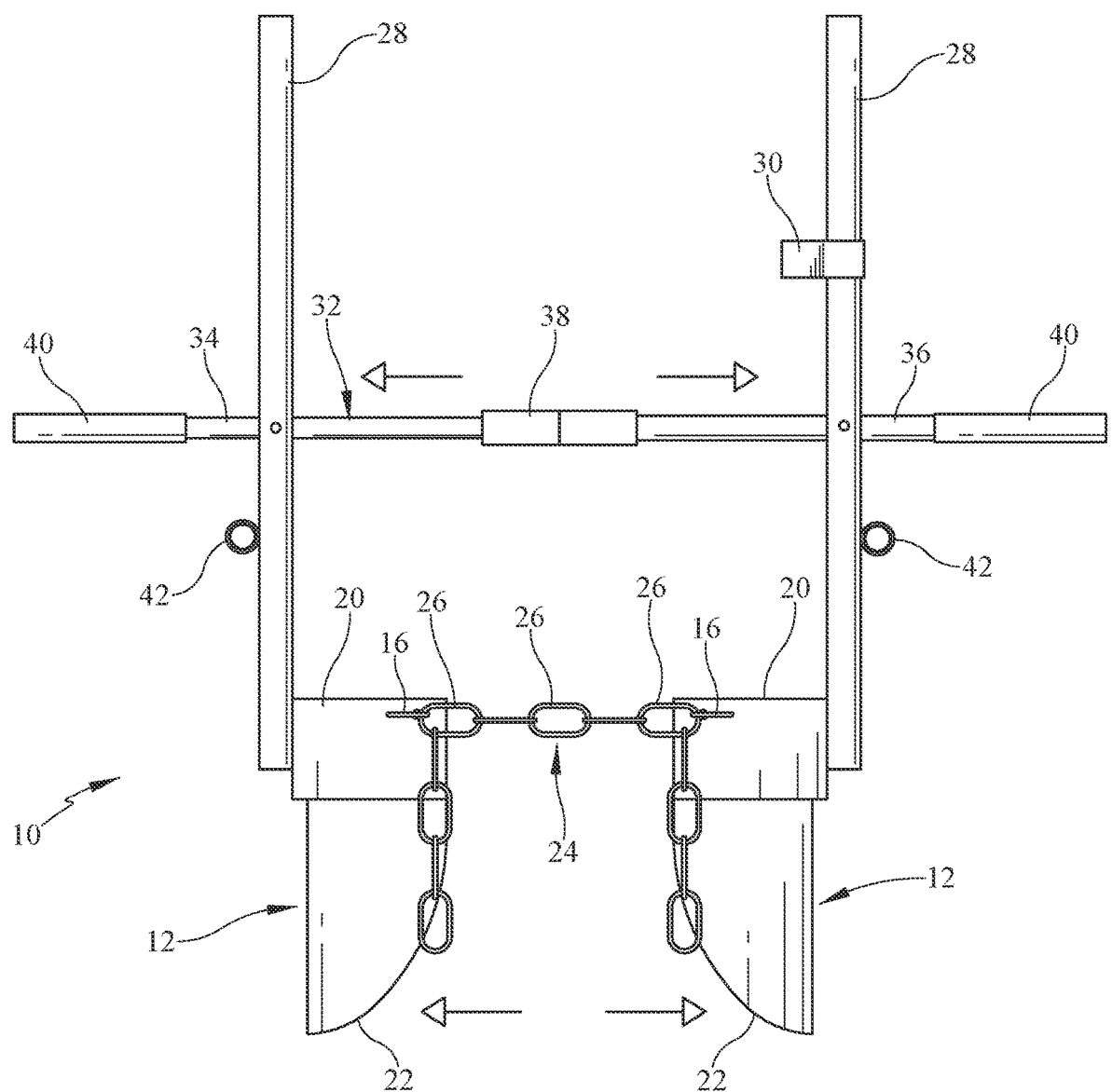
FIG. 5 is a side view of the plant transplanter illustrating the expansion feature of the device.

Referring now to the drawings, it is seen that the plant transplanter of the present invention, generally denoted by reference numeral 10, is comprised of a pair of spaced apart shovel blades 12 of desired style (square blade, tapered blade, rounded blade, pointed tip blade, sawtooth blade, etc.) such that the inner faces 14 of the blades 12 face one another in mirror image fashion. A pair of hooks 16 is attached to an outer surface 18 of each blade 12 proximate the top 20 of the blade 12 near the edge 22 of the blade 12 on either side of the blade 12. Each hook 16 can be a simple open hook as illustrated or can be a closed spring-loaded hook (not illustrated), similar to a carabiner. A chain 24 connects each pair of corresponding hooks 16 such the chain 24 is removably attached to each hook 16. In this way, the maximum separation distance between the two blades 12 is changed by changing which particular link 26 of the chain 24 is secured to hooks. For example, for a given current distance of separation, in order to increase the distance of separation, a link 26 on the side of the chain 24 that is not between the hooks 16 is selected and the current link 26 is detached from its hook 16 and the new, more distal link 26 is attached to the hook 16—this can happen on just one hook 16 or both of the corresponding hooks 16. To shorten the distance between the two blades 12, a link 26 that is between the hooks is selected, the current link 26 is detached from its hook 16 and the new, more proximal link 26 is attached to the hook 16, again, this can occur at one or both of the hooks 16—it also being understood that the chain 24 can be fixedly attached to one of the blades 12 in appropriate fashion with all length variation accruing with the chain 24 and hook 16 on the other blade 12.

A shaft 28 is attached medially to the outer surface 18 of each blade 12 and each shaft 28 extends upwardly. A compass 30 is attached to one of the shafts 28 either along the shaft's length as shown, or to the top of the shaft 28. A horizontal lift bar 32 is pivotally attached to each of the shafts 28. As seen, the horizontal lift bar 32 is comprised of a first section 34 and a second section 36 that are connected to one another via a variable length tension rod 38. Rotation of the tension rod 38 results in an increase in the length of the horizontal lift bar 32 and counter-rotation of the tension rod 38 results in a decrease in length of the horizontal lift bar 32. Appropriate grips 40, made from rubber, neoprene, or the like, can be located on either end of the horizontal lift bar 32.

A transverse sleeve 42 is located on each shaft 28. Each sleeve 42 removably receives a transverse lift bar 44 therein. A set screw 46 may be used to lock the transverse lift bar 44 within its sleeve 42. Of course, the transverse lift bar 44 can be attached directly to the shaft without the need for a sleeve.

The blades 12, the chains 24, the shafts 28, the first section 34 and the second section 36 of the horizontal lift bar 32, the sleeves 42, and the transverse lift bars 44 are each from an appropriate sturdy material, such as aluminum, PVC or similar plastic, etc.

In order to use the plant transplanter 10 of the present invention, the plant transplanter 10 is dimensioned for the size of the plant P to be moved. This is accomplished by setting the length of the chain 24 between the hooks 16 as previously discussed. The tension rod 38 is rotated or counter-rotated in order to set the desired length of the horizontal lift bar 32 between the two shafts 28 to match the chain 24 length between the hooks 16. The appropriate length of the horizontal lift bar 32 is such that each shaft 28 is substantially vertical whenever the section of each chain 24 between each chain's respective hooks 16 is taut. The plant P can be dug out of the ground via the plant transplanter 10 by using the plant transplanter 10 in similar fashion to using a standard post hole digger. Once the plant P is retrieved out of the ground, the plant transplanter 10 holds the plant P and its root bulb R between the two blades 12. As the horizontal lift bar 32 is in tension and is pivotally attached to each shaft 28 and as the length of each chain 24 between each chain's respective hooks 16 is fixed, the tension on the horizontal lift bar 32 causes the blades 12 to press upon and cinch the root bulb R of the plant P. This helps prevent the soil about the root bulb R from falling away. The horizontal lift bar 32 is used to carry the plant transplanter 10 and its plant P passenger to the new location whereat the plant P is to be placed. Once the plant P and its root bulb B are in position, the two shafts are pressed upon near their tops toward one another against the tension of the tension rod of the horizontal lift bar 32. This causes the blades 12 to move away from one another toward their maximum separation distance as set by the chains 24, thereby releasing the blades' grip on the root bulb R of the plant P.

If the plant P and its root bulb R are particularly heavy, then the transverse lift bars 44 are each inserted into their respective sleeve 42 and locked in if using the set screw 46. This allows two people (or more) to use the transverse lift bars 44 to lift the plant P and its root bulb R much easier than using the horizontal lift bar 32.

When transplanting a plant P, it is desirable that the plant P have the same orientation at its final position as the plant P had at its initial position so that it is facing the sun in the same orientation as at its old location. The use of the compass 30 aids a user in achieving this result.

The shafts 28 and their various accouterments can be detached from the blades 12 and the blades 12, separated by the chains 24 can be used as a simple handheld digger.

While the invention has been particularly shown and described with reference to an embodiment thereof, it will be appreciated by those skilled in the art that various changes in form and detail may be made without departing from the spirit and scope of the invention.

I claim:

1. A plant transplanter comprising:
   a first blade having a first outer surface and a first inner surface, the first blade having a first side and a second side;
   a second blade having a second outer surface and a second inner surface, the second blade having a third side and a fourth side;

a first chain having a set of first links such that one of the first links is attached to the first outer surface of the first blade proximate the first side and another of the first links is removably attached to the second outer surface of the second blade proximate the third side;

a second chain having a set of second links such that one of the second links is attached to the first outer surface of the first blade proximate the second side and another of the second links is removably attached to the second outer surface of the second blade proximate the fourth side;

a first shaft attached medially along the first outer surface of the first blade and extending vertically upwardly;

a second shaft attached medially along the second outer surface of the second blade and extending vertically upwardly;

a horizontal lift bar pivotally attached to the first shaft and to the second shaft, the horizontal lift bar oriented horizontally; and wherein the first inner surface of the first blade faces the second inner surface of the second blade.

2. The plant transplanter as in claim 1 further comprising a compass attached to the first shaft.

3. The plant transplanter as in claim 1 further comprising:

a first transverse lift bar attached to the first shaft, the first transverse lift bar oriented horizontally with respect to the first shaft and normally with respect to the horizontal lift bar; and a second transverse lift bar attached to the second shaft, the second transverse lift bar oriented horizontally with respect to the second shaft and normally with respect to the horizontal lift bar.

4. The plant transplanter as in claim 3 further comprising a compass attached to the first shaft.

5. The plant transplanter as in claim 1 wherein the length of the horizontal lift bar between the horizontal lift bar's attachment to the first shaft and the second shaft is variable.

6. The plant transplanter as in claim 1 wherein the horizontal lift bar is comprised of a first section that is attached to the first shaft and a second section that is attached to the second shaft, the first section and the second section connected to one another by a tension rod that places tension between the first section and the second section and wherein the tension rod varies the distance between the first section and the second section.

* * * * *